United States Patent [19]
Lescoat

[11] Patent Number: 6,086,425

[45] Date of Patent: Jul. 11, 2000

[54] ELECTRICAL CONNECTOR DEVICE FOR CO-OPERATING WITH A REMOVABLE ELECTRONIC MEDIUM

[75] Inventor: Jean-Francois Lescoat, Dole, France

[73] Assignee: Amphenol-Tuchel Electronics GmbH, Germany

[21] Appl. No.: 09/203,743

[22] Filed: Dec. 2, 1998

[30] Foreign Application Priority Data

Dec. 3, 1997 [FR] France ................................. 97 15203

[51] Int. Cl.⁷ .................................................. H01R 24/00
[52] U.S. Cl. .......................... 439/630; 439/862; 439/83; 235/441
[58] Field of Search ............................... 439/630, 78, 82, 439/83, 946, 876, 862; 235/441

[56] References Cited

U.S. PATENT DOCUMENTS

| | | | |
|---|---|---|---|
| 4,675,516 | 6/1987 | Guion | 235/441 |
| 5,402,095 | 3/1995 | Janniere | 235/441 |
| 5,882,230 | 3/1999 | Bricaud et al. | 439/630 |
| 5,894,121 | 4/1999 | Brueggemann et al. | 235/441 |

*Primary Examiner*—Paula Bradley
*Assistant Examiner*—Tho D. Ta
*Attorney, Agent, or Firm*—Blank Rome Comisky & McCauley, LLP

[57] ABSTRACT

An electrical connector device for an electronic memory card includes a board of insulating material having at least one slot, at least one electrical connector element in the form of a resilient conductive spring having a fixing end and a contact zone, at least one electrical connection tab disposed on a first face of the board close to the slot, and at least one conductive track formed in the first face of the card to connect the connection tab with at least one contact terminal of the electronic memory card. Each electrical connector element is fixed to a respective electrical connection tab via a fixing end, and the contact portions of each connector element projects from the second face of the board by passing through the slot.

10 Claims, 3 Drawing Sheets

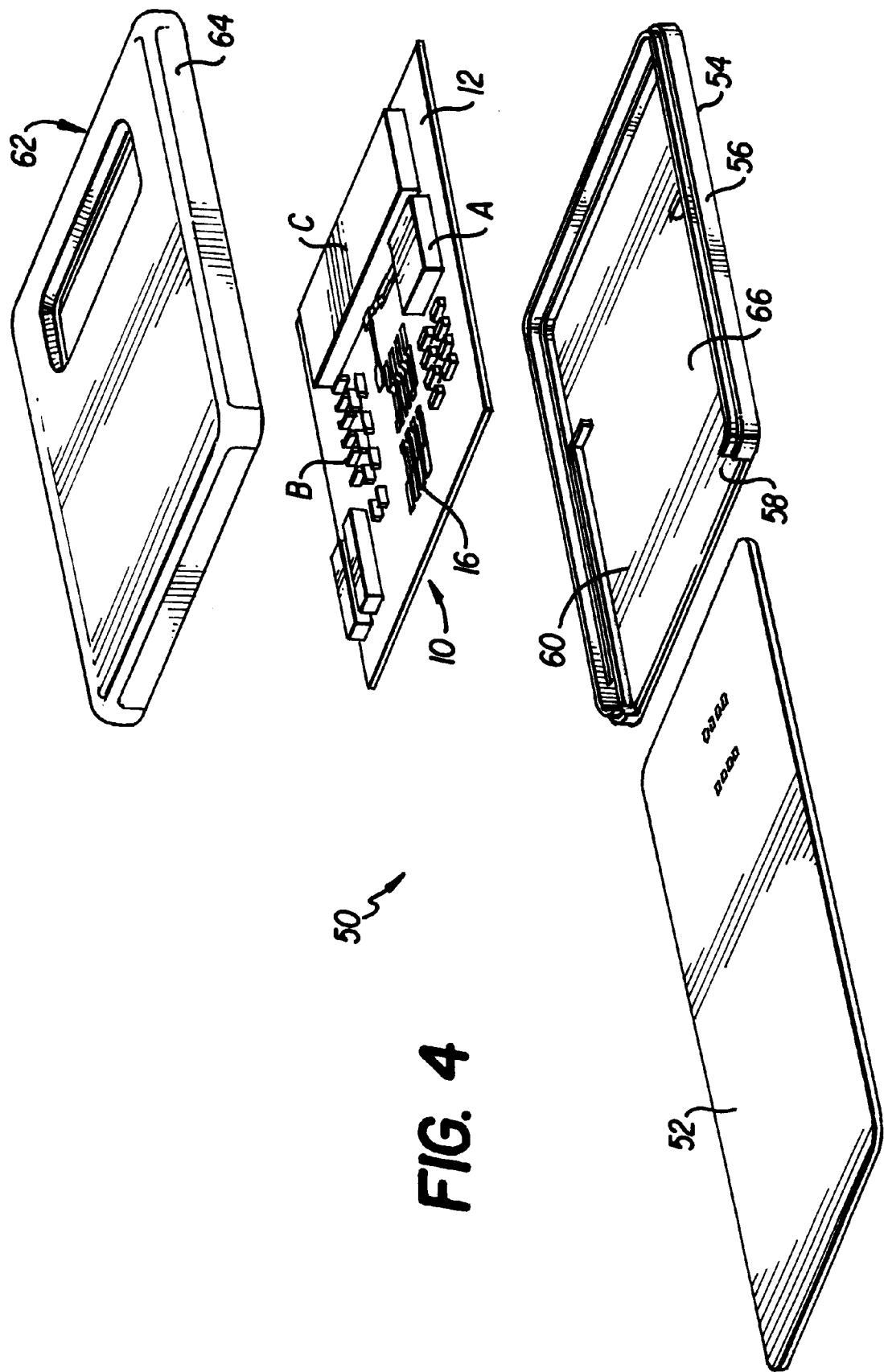

ELECTRICAL CONNECTOR DEVICE FOR CO-OPERATING WITH A REMOVABLE ELECTRONIC MEDIUM

The present invention relates to an electrical connector device for cooperating with a removable electronic medium, in particular an electronic memory card, and to an electronic memory card reader using said electrical connector device.

BACKGROUND OF THE INVENTION

Electronic memory cards are being used more and more widely, e.a. to give access to certain premises or to obtain certain services, or indeed to make certain payments. An electronic memory card is essentially constituted by a flat rectangular body in which an electronic module is inserted, which module has external electrical contact areas on its outside face.

To use such cards, it is necessary for a card to be inserted into a card reader which enables electrical connection o be established between the various external contact areas on the card and the electronic circuits of the reader. Such electrical connections serve firstly to provide electrical power to the integrated circuit of the card, and secondly to transmit a certain amount of information and instructions to and from the card.

Given the wide variety of utilizations for such cards, card readers must in turn be capable of accepting various configurations depending an the utilization of the card. It is therefore advantageous to have card readers available that present configurations that differ depending on the utilization made thereof. Such card readers generally be required to be as low-profile as possible and also as low cost as possible.

In particular, a card reader must include an electrical connector device made up of a certain number of flexible conductive springs which are disposed in such a manner that each spring makes electrical contact with one of the external electrical contact areas of the card when the card is inserted in the reader. These flexible electrical contacts are naturally designed to be connected electrically to various electronic components of the reader to make it possible in particular to read the information contained in the card or to write information for the purpose of performing various operations, with the contacts also serving to supply the card with electricity. It will be understood that it is advantageous to have available an electrical connector device which is as highly integrated as possible inside the reader and which is capable of being used in different reader configurations, which configurations may have respective special cases adapted to their functions.

Circumstances other than readers also exist in which it is necessary to establish an electrical connection with a removable electronic medium provided with at least one external electrical contact area. This applies, for example, to electronic keys.

OBJECTS AND SUMMARY OF THE INVENTION

An object of the present invention is to provide an electrical connector device, in particular for electronic memory cards, and presenting a high degree of integration.

To achieve this object, the electrical connector device comprising:
- a board of insulating material having a first face and a second face and provided with at least one slot;
- at least one electrical connector element in the form of a resilient conductive spring; each electrical connector element having a fixing end and a contact zone for contacting one of the external contact areas of said medium;
- at least one electrical connection tab, each connection tab being disposed on the first face of said board close to a slot; and
- at least one conductive track formed on the first face of the board to connect said connection tab electrically to at least one contact terminal;
- each electrical connector element being fixed to an electrical connection tab via its fixing end, the contact portion of each connector element projecting from the second face of said board by passing through a slot.

It will be understood that by means of the electrical connector device of the invention, in a card reader, the flexible electrical springs for making electrical connection with the card are mounted directly on the insulating board of the printed circuit which itself receives at least some of the electronic components of the card reader. This completely eliminates the need to provide a particular mechanical structure including the resilient electrical contact springs, said structure needing to be fitted to the board and to be electrically connected to the electronic components of the reader it will be understood that this simplifies the structure of the reader and that its thickness can be reduced very significantly, because there is no longer any separate mechanical structure for the electrical connector device.

Another object of the invention is to provide an electronic memory card reader which uses the electrical connector device of the type defined above.

BRIEF DESCRIPTION OF THE DRAWINGS

The invention will be better understood on reading the following description of an embodiment of the invention given by way of non-limiting example. The description refers to the accompanying figures, in which:

FIG. 4 is an exploded view of an electronic memory card reader using the electrical connector device of FIG. 1 to 3;

MORE DETAILED DESCRIPTION

Figure 1:
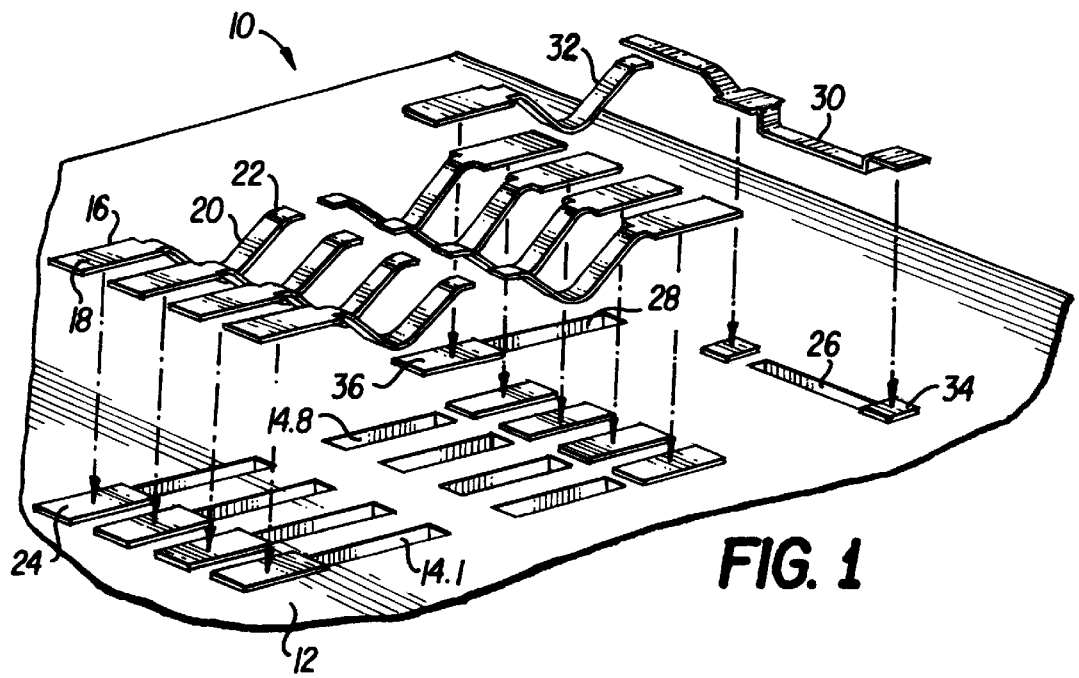
FIG. 1 is a simplified exploded view of the electrical connector device having a plurality of electrical contacts.
Figure 2:
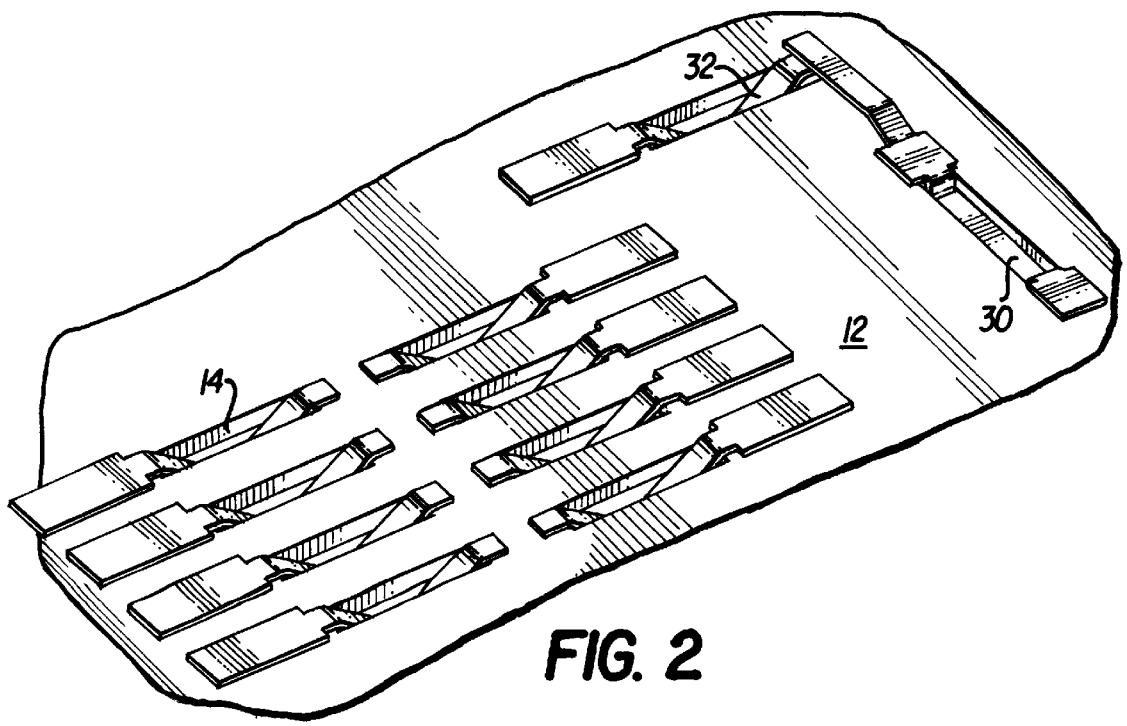
FIG. 2 is a perspective view showing the conductive springs mounted on the printed circuit board.

With reference initially to FIGS. 1 and 2, there follows a description of the principles of the electronic connector device as applied to electronic memory cards.

The device comprises a board 12 of insulating material of the type used for printed circuits. This board is of sufficient strengths Slots such as 14 are formed through the board 12 in positions that correspond to the positions of the external electrical contact areas of the electronic memory card. In the most common configuration, these slots 14 are thus disposed in a 2×4 matrix. In FIG. 1, there can thus be seen slots 14.1 to 14.8. Each of these slots is designed to receive a portion of an electrical connector element given overall reference 16. Each electrical connector element is constituted by a resilient spring of conductive material, e.g. copper or brass. The connector element 16 has a first end 18 for connection and fixing purposes, a folded intermediate zone 20 constituting a zone for making contact with the external contact areas of an electronic memory card, and a free end 22 that is substantially planar. Each slot 14 is associated with an electrical connection tab 24 designed to receive the fixing end 18 of the corresponding connector element. When the fixing portion 18 is soldered to the tab 24 the angled portion of the electrical contact 20 passes through the corresponding slot 14 and projects from the bottom face of the board 12. When the spring 16 is not deformed, its free end 22 presses against the top face of the plate 12.

FIG. 2 shows the various electrical connector elements 14 soldered to the tabs of the insulating board 12.

It will be understood that by means of this particular disposition, the insulating printed circuit board 12 performs two functions. Firstly it serves as a mechanical support and as a support for positioning the various electrical connector elements 16, and secondly it acts as a printed circuit insofar as it is possible, as explained below provide conductive tracks for connecting the contact tabs 24 to various electronic components also mounted on the board 12 and constituting the circuits of the reader in which the electrical connector device is integrated Two additional slots 26 and 28 are preferably also provided through the insulating board 12, with resilient elements 30 and 32 being mounted therein that have the same shape as the conductive springs and that serve as contacts for detecting when an electronic memory card reaches the end of its stroke i.e., its final or end position on being inserted into the card reader. These conductive springs 30 and 32 are also soldered to conductive tabs such as 34 and 36 which are likewise connected to conductive tracks formed on the printed circuit board.

It will be understood that when an electronic memory card is inserted in the reader, as explained below, the thickness of the card causes the contact zones 20 of the connector elements 16 to be raised. Because of the resilience of the springs and because the ends 22 thereof are not secured to the printed circuit board, good electrical contact is indeed obtained with pressure being applied between the electrical connector elements 16 and the external connection areas of the electronic memory card.

Figure 3:
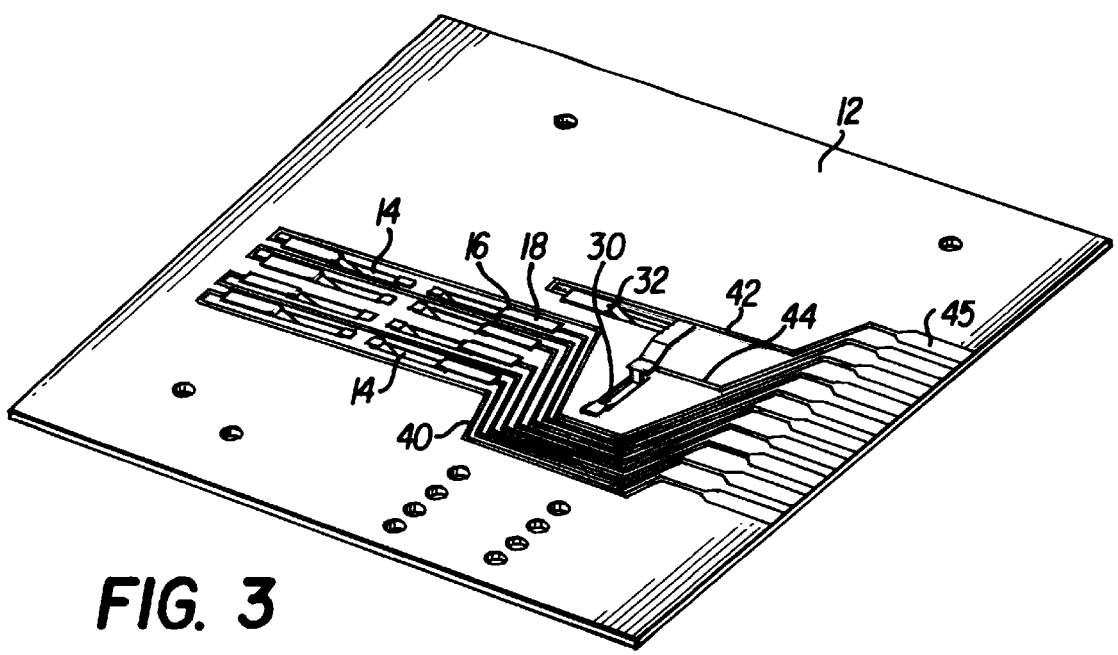
FIG. 3 is a perspective view of a complete electrical connector device.

FIG. 3 shows the printed circuit board 12 in greater detail, its flexible conductive springs 16 being fixed to their contact tabs and various conductive tracks such as 40, 42, and 44 enabling the various electrical contact elements to be connected to the connection areas 45 of electronic components mounted on the printed circuit board 12.

Figure 5:
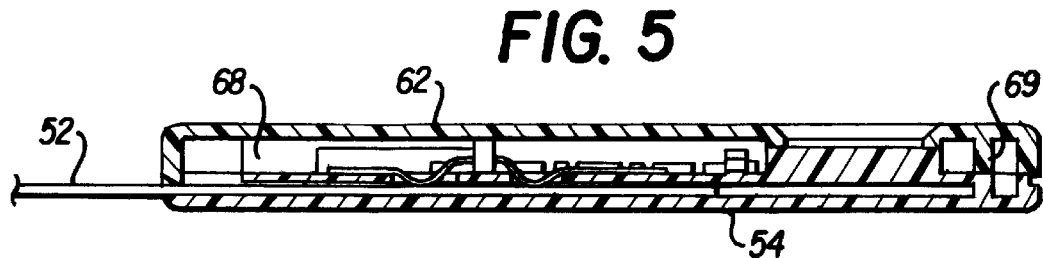
FIG. 5 is a longitudinal vertical section view of an electronic memory card reader of the kind shown in FIG. 4.

With reference now to FIGS. 4 and 5, an embodiment of an electronic memory card reader is described that makes use of an electrical connector device 10 of the type described above.

FIG. 4 shows the electrical connector device 10 constituted by the printed circuit board 12 and its flexible electrical contact springs 16 together with various electronic components A, B, and C which are connected to one another and/or to the electrical contacts 16 via conductive tracks formed on the insulating board 12 by deposited conductor material. For example, the component C may be a liquid crystal display for displaying information relating to use of the electronic memory card or to its state. In this figure, there can also be seen other component parts of the card reader 50, and the memory card itself is referenced 52. The card reader comprises a bottom half-shelf 54 having a rim 56 defining a front insertion slot 58 for the electronic memory card 52. This bottom half-shell also defines a housing 60 for receiving the electronic memory card while it is being processed.

The card reader also has a top half-shell 62 with a rim 64 that can be snap-fastened to the rim 56 of the bottom half-shell. As shown more clearly in FIG. 5, the two half-shells have portions in relief such as 69 and 68 enabling the electrical connector device 10 to be secured between the half-shells in such a manner that the housing 60 for an electronic memory card is defined by the bottom wall 66 of the bottom half-shell 54 and by the bottom face of the printed circuit board 12, this being the face of the board 12 through which the electrical contact springs 16 project, as can be more clearly in FIG. 5.

The board 12 preferably has 2n slots 14, with the slots being disposed in a matrix of 2 rows by n columns.

Figure 6:
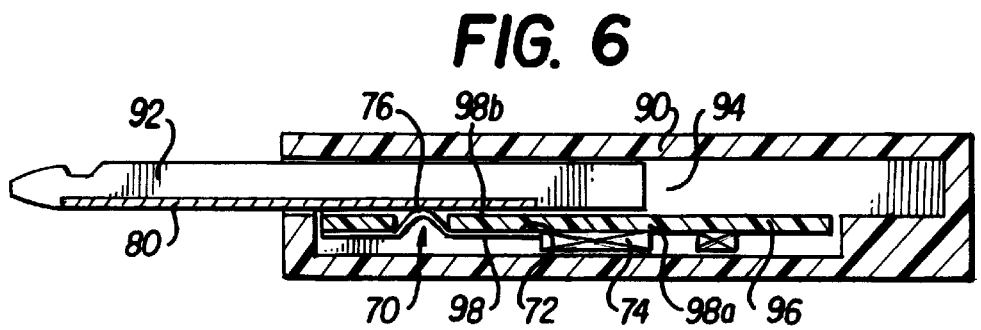
FIG. 6 is a vertical section view of an electronic key using the connector device.

With reference now to FIG. 6, a particular use of the electrical connector device for implementing an electronic key is described. In this embodiment, the connector device has only one contact spring.

In FIG. 6, there can be seen the body 90 of the key and the shank 92 thereof. The shank is slidably mounted in a cavity 94 of the key body. A mechanism (not shown) enables the shank 92 to be moved from a position in which it is retracted inside the body (out of service) and an extended position (for use).

A portion of the bottom wall of the cavity 94 is constituted by The electrical connector device 96. This device is constituted by a printed circuit board 98 pierced by an orifice 70. The bottom face 98a has a conductive track 72 connected to circuits 74 fixed on this face.

A flexible spring projects via the orifice 70 from the top face 98b of the printed circuit. This spring 76 makes contact with the conductive track 80 on the shank 92 of the key.

What is claimed is:

1. An electrical connector device for cooperating with a removable electronic medium provided with at least one external electrical contact area, the device comprising:

a board of insulating material having a first face and a second face and provided with at least one slot;

at least one electrical connector element in the form of a resilient conductive spring; each electrical connector element having a fixing end and a contact zone for said at least one external electrical contact area of said medium;

at least one electrical connection tab, said at least one connection tab being disposed on the first face of said board close to said at least one slot; and said at least one electrical connector element being fixed to said at least one electrical connection tab via its fixing end, the contact zone of each connector element projecting from the second face of said board by passing through said at least one slot, wherein each electrical connector element comprises a planar portion forming the fixing end, a folded intermediate portion forming the contact zone, and a second planar end designed to bear against the first face of said board when said at least one electrical connector element is not elastically deformed.

2. An electrical connector device according to claim 1, further comprising at least one electronic component fixed on said first face and connected to said at least one electrical connector element.

3. An electrical connector device according to claim 1, having a plurality of said slots, a plurality of said electrical connector elements, and a plurality of said conductive tracks.

4. An electrical connector device according to claim 1, wherein said board has 2n slots, the slots being disposed in a matrix of 2 rows by n columns.

5. An electrical memory card reader using the electrical connector device according to claim 1, wherein said removable electronic medium is an electronic memory card, the reader comprising:
- a top half-shell;
- a bottom half-shell defining an insertion slot for an electronic memory card and an internal housing for receiving said card; and
- means for fixing the insulating board of said electrical connector device between said half-shells.

6. An electrical connector device for cooperating with a removable electronic medium provided with at least one external electrical contact area, the device comprising:
- a board of insulating material having a first face and a second face and provided with at least one slot;
- at least one electrical connector element in the form of a resilient conductive spring; each electrical connector element having a fixing end and a contact zone for contacting said at least one external electrical contact area of said medium;
- at least one electrical connection tab, said at least one connection tab being disposed on the first face of said board close to said at least one slot; and
- said at least one electrical connector element being fixed to said at least one electrical connection tab via its fixing end, the contact zone of each connector element projecting from the second face of said board by passing through said at least one slot,
- wherein said board has 2n slots, the slots being disposed in a matrix of 2 rows by n columns, and
- wherein said insulating boards has an additional slot provided with an additional electrical connector element forming an end position detector.

7. An electrical connector device according to claim 6, further comprising at least one electronic component fixed on said first face and connected to said at least one electrical connector element.

8. An electrical connector device according to claim 6, having a plurality of said slots, a plurality of said electrical connector elements, and a plurality of said conductive tracks.

9. An electrical connector device according to claim 6, wherein each electrical connector element comprises a planar portion forming the fixing end, a folded intermediate portion forming the contact zone, and a second planar end designed to bear against the first face of said board when said at least one electrical connector element is not elastically deformed.

10. An electrical memory card reader using the electrical connector device according to claim 6, wherein said removable electronic medium is an electronic memory card, the reader comprising:
- a top half-shell;
- a bottom half-shelf defining an insertion slot for an electronic memory card and an internal housing for receiving said card; and
- means for fixing the insulating board of said electrical device between said half-shells.

* * * * *

UNITED STATES PATENT AND TRADEMARK OFFICE
CERTIFICATE OF CORRECTION

PATENT NO. : 6,086,425
DATED : July 11, 2000
INVENTOR(S) : Lescoat

It is certified that an error appears in the above-identified patent and that said Letters Patent is hereby corrected as shown below:

Column 1, line 12, change "e.a.," to --e.g.,--;
         line 19, change "o" to --on--;
         line 28, change "an" to --on--; and
         line 31, change "be" to --are--.

Column 3, line 23, after "below" insert --,--; and
         line 27, after "integrated" insert --.--.

Column 4, line 16, after "clearly" insert --seen--;
         line 31, change "The" to --the--; and
         line 46, after "for" insert --contacting--.

Column 5, line 7, change "n" to --n--.

Column 6, line 31, after "electrical" insert --connector--.

Signed and Sealed this

Twenty-second Day of May, 2001

Attest:

NICHOLAS P. GODICI

Attesting Officer    Acting Director of the United States Patent and Trademark Office